(12) United States Patent
Dupuis et al.

(10) Patent No.: US 10,743,092 B2
(45) Date of Patent: *Aug. 11, 2020

(54) LOW-CROSSTALK ELECTRO-OPTICAL MACH-ZEHNDER SWITCH

(71) Applicant: INTERNATIONAL BUSINESS MACHINES CORPORATION, Armonk, NY (US)

(72) Inventors: Nicolas Dupuis, New York, NY (US); Benjamin G. Lee, Ridgefield, CT (US); Alexander V. Rylyakov, Staten Island, NY (US); Mehmet Soyuer, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 952 days.

This patent is subject to a terminal disclaimer.

(21) Appl. No.: 14/746,573

(22) Filed: Jun. 22, 2015

(65) Prior Publication Data

US 2017/0099529 A1    Apr. 6, 2017

Related U.S. Application Data

(63) Continuation of application No. 14/686,226, filed on Apr. 14, 2015, now Pat. No. 10,142,711.

(51) Int. Cl.
*H04Q 11/00* (2006.01)
*G02F 1/225* (2006.01)
(Continued)

(52) U.S. Cl.
CPC ....... *H04Q 11/0005* (2013.01); *G02F 1/0147* (2013.01); *G02F 1/225* (2013.01);
(Continued)

(58) Field of Classification Search
CPC ....... H04Q 2011/0049; H04Q 11/0005; H04Q 2011/0035; H04Q 2011/0039;
(Continued)

(56) References Cited

U.S. PATENT DOCUMENTS 5,970,185 A    10/1999  Baker et al.
6,163,633 A *  12/2000  Ueda .................... G02F 1/3136
                                              356/477

(Continued)

FOREIGN PATENT DOCUMENTS

JP          4352133 B2    10/2009

OTHER PUBLICATIONS

Chiba et al; Low-Crosstalk Balanced Bridge Interferometric-Type Optical Switch for Optical Signal Routing; Dec. 2013; IEEE Journal of selected topics in Quantum Electronis vol. 19, No. 6.*

(Continued)

*Primary Examiner* — Amritbir K Sandhu
(74) *Attorney, Agent, or Firm* — Tutunjian & Bitetto, P.C.; Kevin Michael Jordan

(57) ABSTRACT

Optical switches and methods of switching include a first hybrid coupler configured to accept an input and to provide two branches. A phase tuner on a first branch includes a Mach-Zehnder phase shifter configured to shift a signal on the first branch by a selected phase. A loss compensator on a second branch is configured to match a loss incurred on the first branch. A second hybrid coupler is configured to recombine the two branches such that the phase shift generated by the phase tuner determines which output of the second hybrid coupler is used.

9 Claims, 4 Drawing Sheets

(51) Int. Cl.
*G02F 1/01* (2006.01)
*G02F 1/313* (2006.01)
*H04B 10/079* (2013.01)
*H04J 14/02* (2006.01)
*G02F 1/21* (2006.01)

(52) U.S. Cl.
CPC ....... *G02F 1/3136* (2013.01); *H04B 10/0795* (2013.01); *H04J 14/0212* (2013.01); *G02F 2001/212* (2013.01); *H04Q 2011/0035* (2013.01); *H04Q 2011/0039* (2013.01); *H04Q 2011/0041* (2013.01); *H04Q 2011/0049* (2013.01)

(58) Field of Classification Search
CPC ........... H04Q 2011/0041; G02F 1/0147; G02F 1/225; G02F 1/3136; G02F 2001/212; H04B 10/0795; H04J 14/0212
USPC .......................................... 385/16; 398/25–33
See application file for complete search history.

(56) References Cited

U.S. PATENT DOCUMENTS

| | | | |
|---|---|---|---|
| 6,317,526 B1* | 11/2001 | Shirasaki | G02F 1/2252 356/477 |
| 6,453,086 B1 | 9/2002 | Tarazona | |
| 6,842,569 B2 | 1/2005 | Thaniyavarn | |
| 7,324,713 B2* | 1/2008 | Jang | H04B 10/677 359/237 |
| 7,492,975 B2 | 2/2009 | Toyoda et al. | |
| 8,718,486 B2 | 5/2014 | Barton et al. | |
| 9,485,552 B1* | 11/2016 | Dupuis | H04Q 11/0005 |
| 2003/0039461 A1* | 2/2003 | How Kee Chun | G02F 1/225 385/140 |
| 2006/0075866 A1* | 4/2006 | Brunson | B23D 45/044 83/471.3 |
| 2007/0189662 A1* | 8/2007 | Nakamura | G02F 1/3517 385/16 |
| 2009/0201576 A1 | 8/2009 | Bolshtyansky et al. | |
| 2010/0111470 A1 | 5/2010 | Assefa et al. | |
| 2013/0156061 A1 | 6/2013 | Johansson et al. | |
| 2013/0251302 A1 | 9/2013 | Bernasconi | |
| 2013/0322809 A1* | 12/2013 | Goh | H04B 10/5161 385/3 |
| 2014/0355979 A1* | 12/2014 | Dorin | H04Q 11/0005 398/27 |
| 2014/0375999 A1* | 12/2014 | Okamoto | G01J 3/4531 356/451 |
| 2016/0238795 A1* | 8/2016 | Tan | G02B 6/3546 |
| 2017/0099259 A1 | 4/2017 | Joe et al. | |
| 2018/0062754 A1* | 3/2018 | Dupuis | G02F 1/225 |
| 2018/0084318 A1 | 3/2018 | Dupuis et al. | |

OTHER PUBLICATIONS

Wang et al; Mach-Zehnder based 2×2 electro-optical switches on silicon-on-insulator with low crosstalk, 2012, IEEE, pp. 300-302.*
Chiba et al; Low-crosstalk balanced bridge interferometric type optical switch for optical signal routing, Jul. 2013, IEEE.*
Rylyakov et al; Silicon photonic switches hybrid-integrated with CMOS drivers; Jan. 2012, IEEE journal of solid state circuits, pp. 1-10.*
Chiba et al; Low-Crosstalk Balanced Bridge Interferometric Type Optical Switch for optical Signal routing; Dec. 2013; pp. 1-7. (Year: 2013).*
Lee, B. et al. "Monolithic Silicon Integration of Scaled Photonic Switch Fabrics, CMOS Logic, and Device Driver Circuits," Journal of Lightwave Technology, Feb. 15, 2014, pp. 743-751, vol. 32, No. 4.
Dupuis, N. et al. "A low-crosstalk electro-optical 2×2 Mach-Zehnder switch," Jun. 9, 2014, pp. 1-5.
Kasahara, R. et al. "Low-Power Consumption Silica-Based 2×2 Thermooptic Switch Using Trenched Silicon Substrate, " IEEE Photonics Technology Letters, Sep. 1999, pp. 1132-1134, vol. 11, No. 9.
List of IBM Patents or Patent Applications Treated as Related.
Non-Final Office Action for U.S. Appl. No. 16/406,452 dated Jun. 26, 2019 (38 pages).
Notice of Allowance for U.S. Appl. No. 16/152,907 dated Mar. 1, 2019 (12 pages).

\* cited by examiner

LOW-CROSSTALK ELECTRO-OPTICAL MACH-ZEHNDER SWITCH

CROSS REFERENCE TO RELATED APPLICATIONS

This application is a Continuation application of co-pending U.S. patent application Ser. No. 14/686,226, filed on Apr. 14, 2015, incorporated herein by reference in its entirety.

STATEMENT REGARDING FEDERALLY SPONSORED RESEARCH OR DEVELOPMENT

This invention was made with Government support under Contract No. W911NF-12-2-0051 awarded by Defense Advanced Research Projects Agency (DARPA). The Government has certain rights to this invention.

BACKGROUND

Technical Field

The present invention relates to optical switching and, more particularly, to optical switches that exhibit low crosstalk between outputs.

Description of the Related Art

Integrated 2×2 Mach-Zehnder interferometers can be used as basic elements of large transparent optical switches. An input signal is split in a 3-dB input coupler along two branches and the branches are subsequently recombined at a 3-dB output coupler. A phase controller is used on each branch to control how the signals on the branches are recombined, resulting in an output along either the first or the second branch of the output coupler. When the phase difference between the two branches is $(2n+1)\pi$, the first branch is selected, and when the phase difference is $2n\pi$, the second branch is selected.

In reality, however, there is usually some light leakage at the non-selected output that can be due to power imbalance in the interferometer, phase errors (where the phase controllers do not produce, for example, perfect integer multiples of pi), and imperfect couplers. This crosstalk puts a limit on the effectiveness of the switch, as less than full power is transmitted along the selected output and a potentially significant signal is present on the non-selected output.

One existing solution is to use a thermo-optic phase shifter on one branch that has a phase range from zero to pi. This can achieve a low crosstalk, but switching speeds are on a millisecond-scale, whereas optical switching networks could benefit from nanosecond-scale switching.

Electro-optical phase shifters using carrier injection in a pin diode, where a phase shift is obtained by modulating the carrier density. This can achieve nanosecond-scale switching rates, but carrier injection creates optical losses due to free-carrier absorption. A power imbalance results, affecting the crosstalk. Such a system produces, at best, −20 dB of isolation. This result can be improved somewhat by using push-pull drive configuration, with one phase shifter on each branch having a phase range of zero to one-half pi, but this produces only a moderate benefit and an isolation of about −25 dB.

As such, no existing solution can produce nanosecond-scale switching and a suitably low crosstalk.

SUMMARY

An optical switch includes a first hybrid coupler configured to accept an input and to provide two branches. A phase tuner on a first branch includes a Mach-Zehnder phase shifter configured to shift a signal on the first branch by a selected phase. A loss compensator on a second branch is configured to match a loss incurred on the first branch. A second hybrid coupler is configured to recombine the two branches such that the phase shift generated by the phase tuner determines which output of the second hybrid coupler is used.

A system for optical switching includes an optical switch and a control module. The optical switch includes a first branch comprising a Mach-Zehnder phase shifter and a first heater and a second branch comprising a loss compensator configured to match a loss incurred on the first branch and a second heater. The control module is configured to select a phase shift in the Mach-Zehnder phase shifter to determine an output of the optical switch and to activate the first or second heater to reduce crosstalk between outputs of the optical switch.

A method for optical switching includes setting a phase shift in a first branch of an optical switch. A loss compensation in a second branch of the optical switch is set to match a loss incurred on the first branch. A crosstalk at an output of the optical switch is measured and, if the measured crosstalk exceeds a crosstalk threshold, a heater is activated on the first or second branch to reduce the crosstalk.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

To achieve low crosstalk at high switching speeds, the present invention provides a 2×2 Mach-Zehnder (MZ) switch having a phase tuning mechanism and a loss compensating mechanism. A nested design is used in one embodiment, with a first MZ switch implemented on one branch of a second MZ switch.

Figure 1:
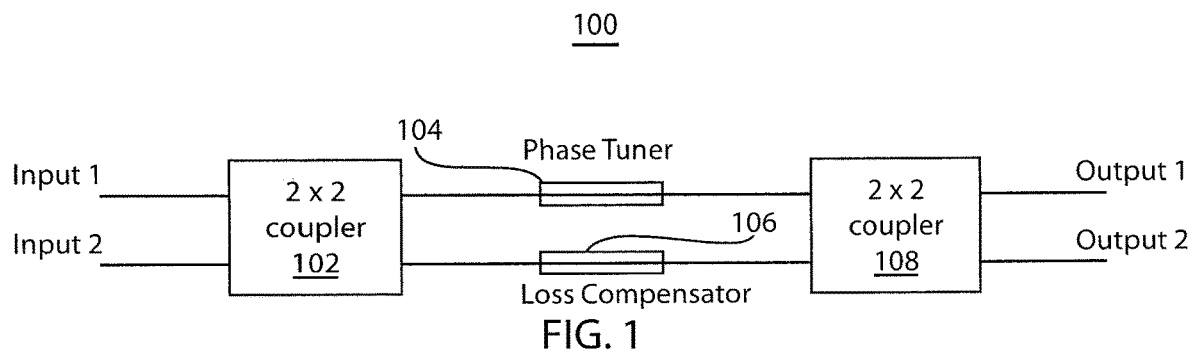
FIG. 1 is a block diagram of a low-crosstalk optical switch in accordance with the present principles.

Referring now to the drawings in which like numerals represent the same or similar elements and initially to FIG. 1, a diagram of the low-crosstalk MZ switch 100 is shown. A first 2×2 coupler 102 accepts two inputs from, e.g., respective waveguides. These inputs represent signals that are coupled in the coupler 102 to produce two mixed signals along the outputs of the coupler 102. A phase tuner 104 is implemented on the first output of the coupler 102, while a loss compensator 106 is implemented on the second output of the coupler 102. A second 2×2 coupler 108 is then used to combine the "internal" branches of the MZ switch. Depending on the relative phase of the two branches, either a first output or a second output waveguide is used to provide the output signal. It is specifically contemplated that the couplers 102 and 108 are 2×2 3 dB hybrid couplers that split the input power equally between two output branches. It should be understood that, while the present structures are shown as implementing a four-way optical switch, the present principles may be used to implement an optical switch having any combination of M input ports and N output ports.

One embodiment includes a phase shifter 104 implemented with a MZ phase shifter driven in push-pull for digital phase modulation. The loss compensator 106, meanwhile, can be a fixed or tunable attenuator. An implementation of a tunable attenuator could be a forward biased pin diode, also called a variable optical attenuator (VOA). If insertion losses of the phase shifter 104 are known, the loss compensator 106 can also be implemented by implanting dopants into a short section of the waveguide or using reflection elements or scattering elements.

It is specifically contemplated that the present embodiments may be implemented using optical waveguides on a silicon substrate, but any appropriate materials may be used. In particular, some alternatives include SiN, SiON, $SiO_2$, InP, GaAs, $LiNbO_3$, and polymer materials.

Figure 2:
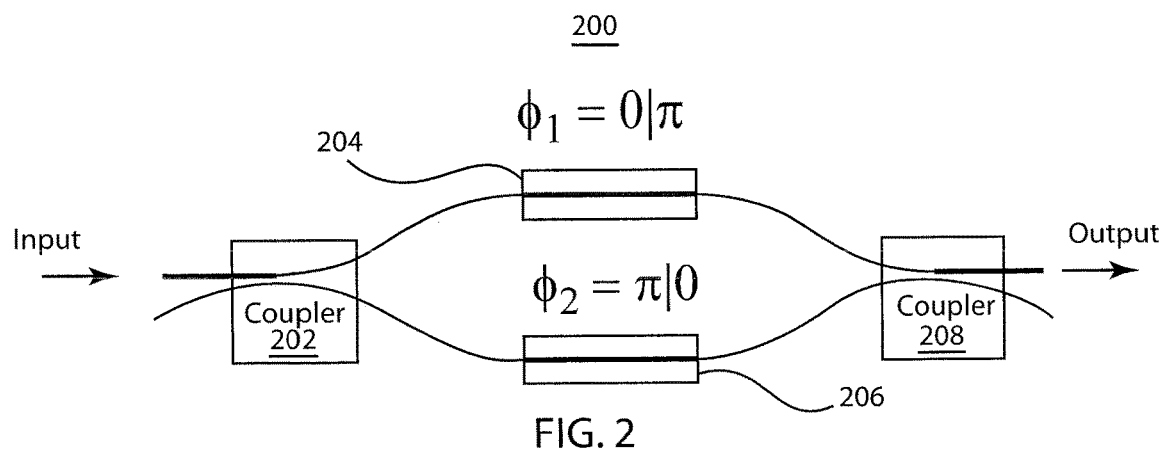
FIG. 2 is a block diagram of a phase shifter used in a low-crosstalk optical switch in accordance with the present principles.

Referring now to FIG. 2, a diagram of a MZ phase shifter 200 is shown, which may be used as an implementation of the phase tuner 104. A single input is provided to a first 2×2 coupler 202, with the other input being left unconnected. The coupler 202 splits the single input into two branches. A first branch has a first phase shifter 204 and a second branch has a second phase shifter 206. This embodiment uses a push-pull configuration, where each of the phase shifters have a range of zero to pi and operate in opposition to one another. The branches are coupled again at a second 2×2 coupler 208, where a single, phase-shifted output is taken as the output of the MZ phase shifter 200.

Assuming perfect 3 dB couplers are used for couplers 202 and 208, assuming phase shifters with no insertion loss, and assuming normalized input, the field at the output of the MZ phase shifter 200 at a phase shift $\Delta\phi$ is:

$$T(\Delta\phi) = e^{\frac{j(\phi_1+\phi_2)}{2}} \sin\left(\frac{\Delta\phi}{2}\right).$$

where $\phi_1$ and $\phi_2$ are phases selected by the respective phase shifters 204 and 206 and where $\Delta\phi$ is the difference between $\phi_1$ and $\phi_2$.

When driving the phase shifters 204 and 206 in a push-pull fashion with $\Delta\phi=\pm\pi$, the field at the output of the phase shifter 200 simplifies to:

$$T(\pm\pi)=\pm j,$$

producing a digital phase shift. If the insertion loss of the phase shifter 200 is $\alpha$, then the output field is:

$$T(\pm\pi)=\pm j(1-\alpha).$$

The lower branch of the switch 100 therefore needs to match this loss. The loss tuner 106 is, for example, a VOA implemented as a forward biased pin diode. The output of the loss compensator 106 can be:

$$T=1-\alpha,$$

Assuming perfect couplers and perfect drive, the present embodiments provide exemplary crosstalk suppression of about −90 dB.

Figure 3:
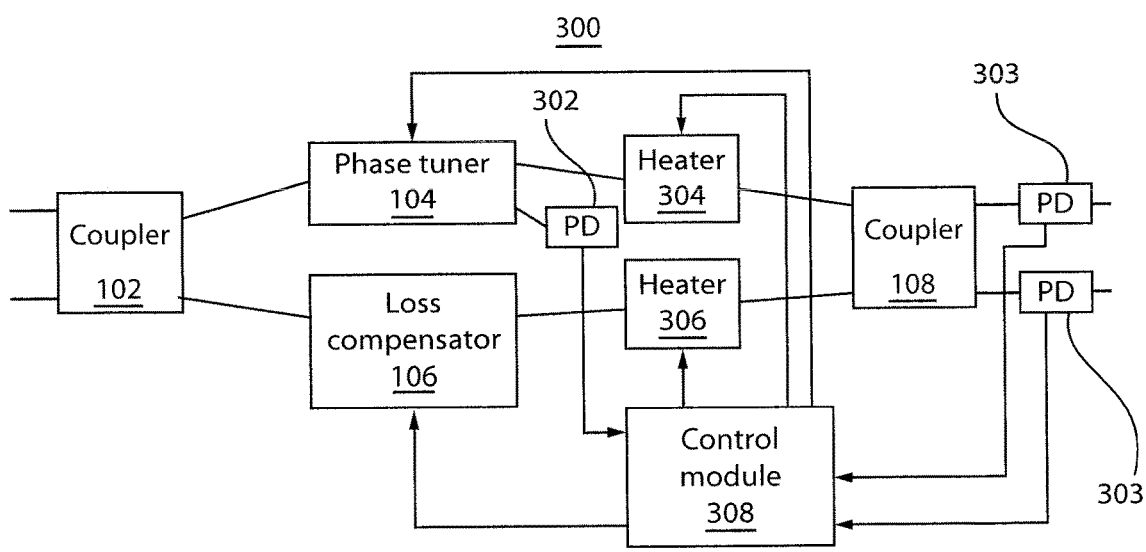
FIG. 3 is a block diagram of a low-crosstalk optical switch in accordance with the present principles.

Referring now to FIG. 3, an alternative embodiment of a nested MZ switch 300 is shown that uses a feedback loop to correct phase and amplitude errors. The switch 300 uses phase detectors 302 to measure phase performance. In addition, two heaters 304 and 306 are used to correct phase errors that are present inside the interferometer. The heaters may be implemented using any appropriate technology, including resistive heating and thermoelectric effect heating. Because phase error is relatively stable compared to the switching speed, heaters are sufficient to correct for phase drift.

The phase detector 302 at the output of the phase tuner 104 measures the square of the phase error. The feedback loop thus tests both heaters 304 and 306 to pick the heater than minimizes the crosstalk, as measured by photodetectors 303 at the output, where the photodetectors 303 tap about 1% of the power of the optical output to measure the power and crosstalk of the outputs. A control module 308 collects phase information from the phase detector 302 and power and crosstalk information from photodetectors 303 and determines which heater to use. Based on the phase information collected by the phase detector 302 and the crosstalk information collected by photodetectors 303, the control module 308 activates either a first heater 306 or a second heater 304 to correct the phase error.

Fabrication imperfections that lead to different doping levels in optical circuit components, slightly different phase shifter lengths, different waveguide roughness, and other factors can introduce additional phase error in the switch 100 and thus increase the level of crosstalk. For example, if the phase difference produced by the phase tuner 200 is $\Delta\phi\neq\pm\pi$, the transmission of an MZ phase tuner 200 will be:

$$T(\Delta\phi) = e^{\frac{j(\phi_1+\phi_2)}{2}} \sin\left(\frac{\Delta\phi}{2}\right)(1-\alpha),$$

and the phase error is:

$$\epsilon_\phi = \frac{\pi}{2} - \frac{\phi_1+\phi_2}{2}.$$

To compensate for this phase error, the present embodiments add either $-\epsilon_\phi$ to the upper arm or add $\epsilon_\phi$ to the lower arm. Assuming that the phase error is small, the power at the second output of the phase tuner 200—the output that reaches a phase detector 302—is approximated as:

$$P_l = |T|^2 \sim \frac{(1-\alpha)^2 \epsilon_\phi^2}{4}$$

with a phase error of:

$$\epsilon_\phi \approx \pm \frac{2\sqrt{P_l}}{1-a}.$$

The phase error can then be detected by the phase detector 302 at the lower output port of the phase tuner 200.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
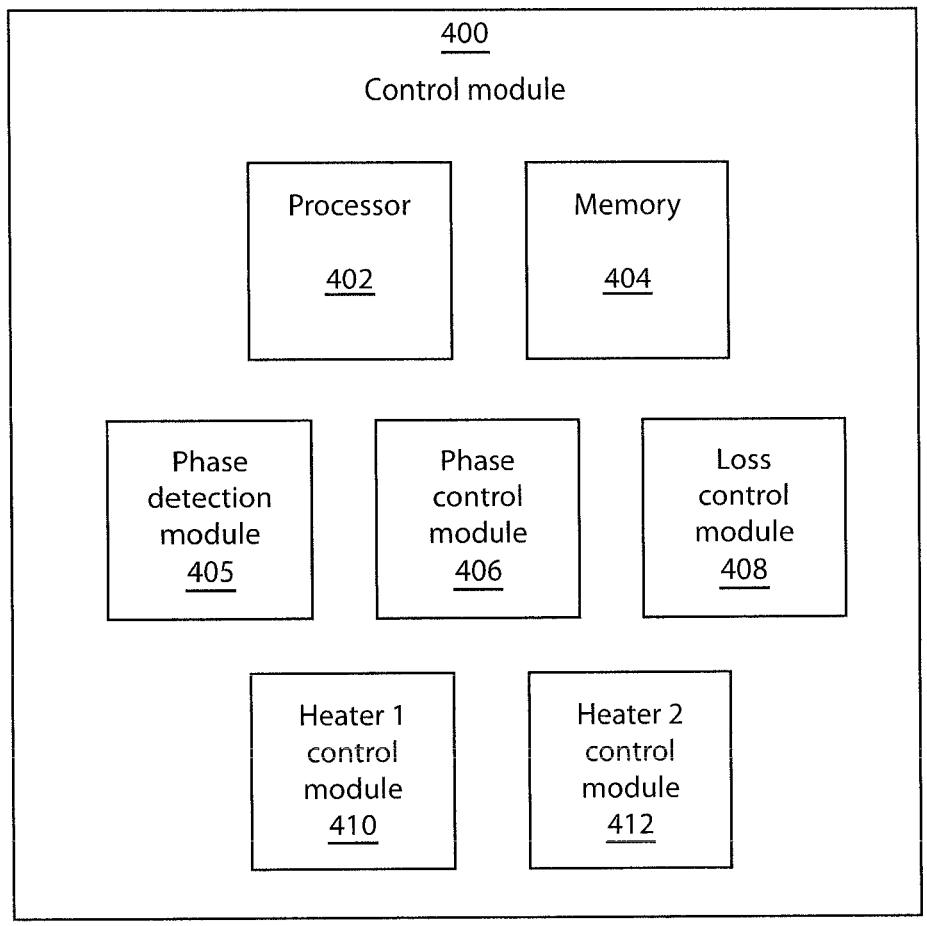
FIG. 4 is a block diagram of a control module for a low-crosstalk optical switch in accordance with the present principles.

Referring now to FIG. 4, a block diagram of a control module 400 is shown. The control module 400 includes a processor 402 and memory 404. The processor 402 interacts with a set of different modules, each of which may be implemented as software, as hardware in the form of an application-specific integrated chip or field programmable gate array, or as a combination of software and hardware modules. The memory 404 stores phase information and setting information for phase and loss control.

A phase detection module 405 receives phase information from the phase detectors 302 to determine the phase error inside the interferometer. A phase control module 406 interfaces with the phase tuner 104 to control the phase of the signal passing through that branch. A loss control module 408, meanwhile, interfaces with the loss compensator 106 to control the loss passing through its respective branch to match the loss of the phase-controlled branch. Heater control modules 410 and 412 interface with respective heaters 304 and 306 to trigger heating of one branch or the other to correct for phase differences.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
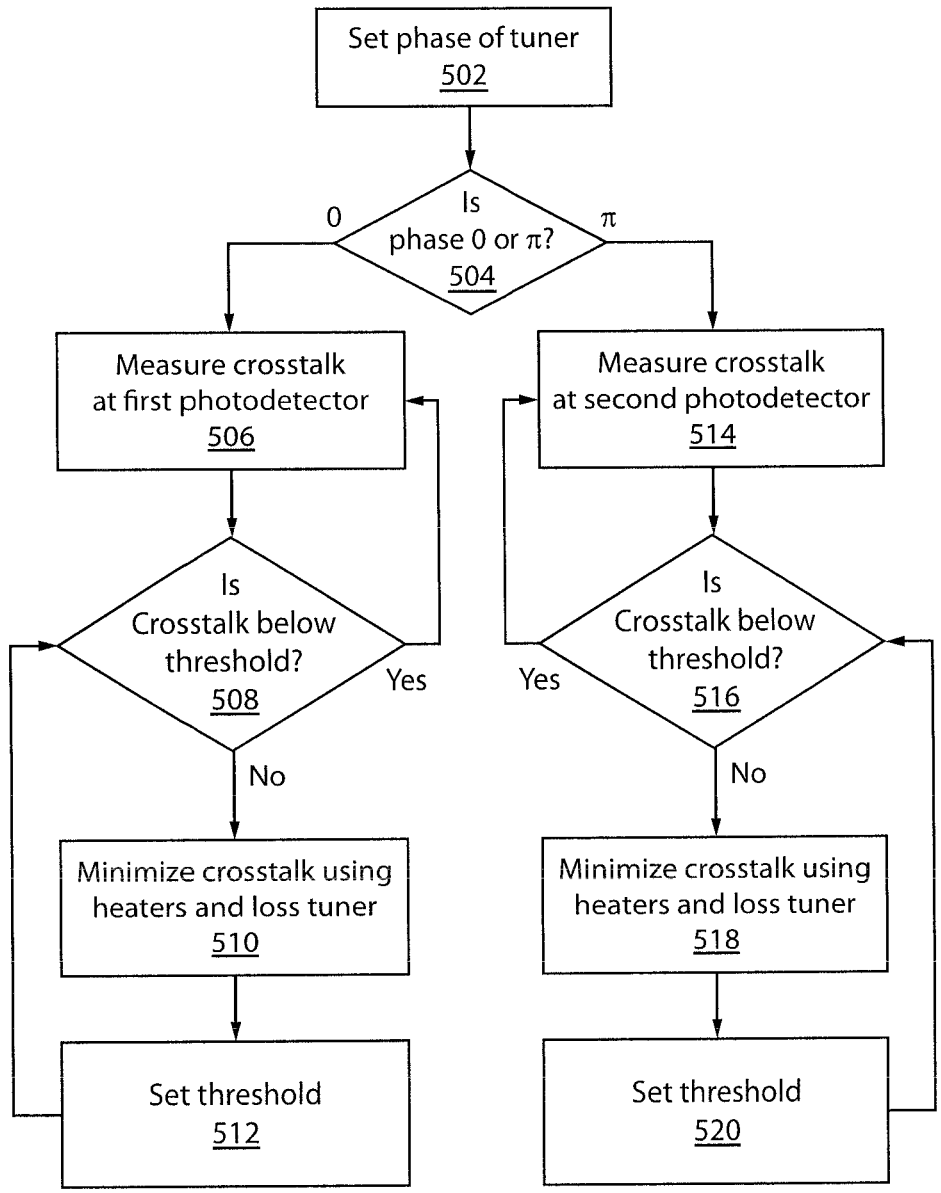
FIG. 5 is a block/flow diagram of switching control in accordance with the present principles.

Referring now to FIG. 5, a method for operating a low-crosstalk optical switch is shown. This embodiment operates without the phase error detecting phase detector 302. Block 502 sets the phase of the phase tuner 104 as needed for switching. Based on which phase—zero or pi—is selected, a different branch is used to work with a different heater. In the case of a phase of zero at the phase tuner 104, block 506 measures crosstalk at a first photodetector 303. An initial acceptable threshold is set low (e.g., at zero) to ensure that the loop is run at least once. If the crosstalk is below the acceptable threshold at block 508, processing returns to block 506. If crosstalk is above the threshold, block 510 uses the heaters 304 and 306 and loss compensator 106, if implemented as a loss tuner, to reduce the crosstalk. Block 512 then adjusts the threshold accordingly to match the crosstalk value achieved by the adjustment.

In the case of a phase of pi at the phase tuner 104, block 514 measures crosstalk at a second photodetector 303. If the crosstalk is below an acceptable threshold at block 516, processing returns to block 514. If crosstalk is above the threshold, block 518 uses the heaters 304 and 306 and loss compensator 106, if implemented as a loss tuner, to reduce the crosstalk. Block 520 then adjusts the threshold accordingly.

Figure 6:
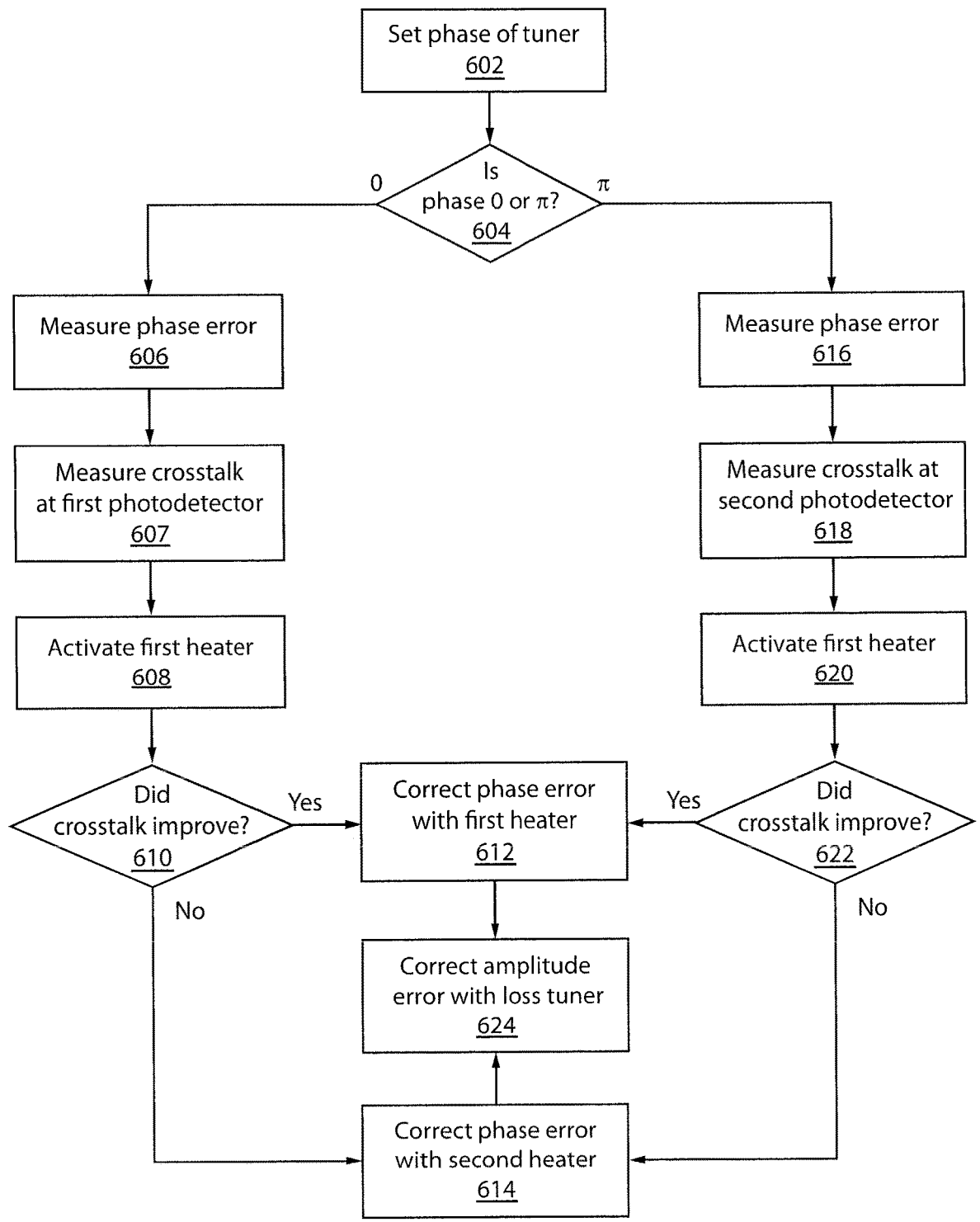
FIG. 6 is a block/flow diagram of switching control in accordance with the present principles.

Referring now to FIG. 6, a method for operating a low-crosstalk optical switch is shown. Block 602 sets the phase of the phase tuner 104 as needed for switching. Based on which phase—zero or pi—is selected, a different branch is used to work with a different photodetector. In the case of a phase of zero at the phase tuner 104, block 606 measures the phase error at the photodetector 302. The crosstalk is then measured at a first output photodetector 303 at block 607 and a first heater, either 304 or 306, is activated at block 608. Block 610 determines whether crosstalk has improved based on the measurement at the first photodetector 303. If crosstalk improved under the action of the first heater, block 612 corrects the remaining phase error using the first heater. Otherwise, block 614 corrects the remaining phase error with a second heater, either 306 or 304.

In the case of a phase of pi at the phase tuner 104, block 616 measures the phase error at the phase detector 302. The crosstalk is then measured at a second output photodetector 303 at block 618 and a first heater, either 304 or 306, is activated at block 620. Block 622 determines whether crosstalk has improved based on the measurement at the second photodetector 303. If crosstalk improved under the action of the first heather, block 612 corrects the remaining phase error with using the first heater. Otherwise, block 614 corrects the remaining phase error with the second heater, either 306 or 304.

Regardless of which heater is used, block 624 may optionally use the loss compensator 106. This step is only used if the loss compensator 106 is implemented as a loss tuner rather than a static loss compensation.

Having described preferred embodiments of a low-crosstalk electro-optical Mach Zehnder switch and method for operating the same (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for optical switching, comprising:
   setting a phase shift in a first branch of an optical switch;
   measuring a loss incurred on the first branch;
   setting an attenuation in a second branch of the optical switch to match the measured loss;
   measuring a crosstalk at an output of the optical switch;
   when the measured crosstalk exceeds a crosstalk threshold, activating a heater on one of the first or second branch to reduce the crosstalk; and
   adjusting the crosstalk threshold after activating the heater.

2. The method of claim 1, wherein the crosstalk is measured at one of two outputs in accordance with the phase shift.

3. The method of claim 1, wherein the first branch comprises a Mach-Zehnder phase shifter driven in push-pull.

4. The method of claim 3, further comprising measuring a phase error at an output of the Mach-Zehnder phase shifter.

5. The method of claim 1, wherein activating the heater on one of the first or second branch comprises selecting a heater to activate based on activating a first heater and determining whether crosstalk improves.

6. The method of claim 5, further comprising activating a second heater on the other of the first or second branch if activating the first heater failed to reduce crosstalk.

7. The method of claim 1, wherein setting the attenuation comprises setting a tunable attenuator.

8. The method of claim 7, wherein the tunable attenuator comprises a forward biased pin diode.

9. The method of claim 1, wherein only the first branch comprises a tunable phase shifter.

\* \* \* \* \*